United States Patent [19]

Zimmer et al.

[11] 4,059,398

[45] Nov. 22, 1977

[54] FOOD OVEN

[75] Inventors: Elvis Simon Zimmer, Cedar; David Allen Hassell, Coon Rapids, both of Minn.

[73] Assignee: Jeno F. Paulucci, Duluth, Minn.

[21] Appl. No.: 676,211

[22] Filed: Apr. 12, 1976

[51] Int. Cl.² ............................................. F27B 9/00
[52] U.S. Cl. ................... 432/121; 126/21 A; 432/56; 432/134; 432/143; 432/247
[58] Field of Search ............... 432/121, 134, 143, 153, 432/193, 194, 233, 247, 250, 56; 126/21 R, 21 A; 34/236

[56] References Cited

U.S. PATENT DOCUMENTS

| 987,212 | 3/1911 | Betz | 432/250 |
|---|---|---|---|
| 2,033,331 | 3/1936 | Coriolis et al. | 432/250 |
| 2,513,480 | 7/1950 | Heth | 34/236 |
| 2,593,273 | 4/1952 | Crosland | 432/143 |
| 2,688,808 | 9/1954 | Ipsen | 126/21 A |
| 3,330,050 | 7/1967 | Ausherman | 34/236 X |
| 3,368,802 | 2/1968 | Morgan et al. | 432/247 |

Primary Examiner—John J. Camby
Attorney, Agent, or Firm—Henry C. Kovar

[57] ABSTRACT

An oven is disclosed having an inner shell forming a heatable oven chamber, a conveyor within the oven chamber, a layer of insulation around the inner shell, an exterior cabinet shell spaced outward from the insulation, and a fan for moving a flow of cooling air between the insulation and the exterior shell; also disclosed in the oven is an inlet to the oven chamber having separate inner and outer doors operatively connected together, an outlet from the oven chamber having a discharge chute directed into an exterior outlet frame with insulation between the chute and the frame, and a single electric motor connected to operate both the cooling fan and a friction drive connected to drive the conveyor.

31 Claims, 3 Drawing Figures

FOOD OVEN

BACKGROUND OF THE INVENTION

1. FIELD OF THE INVENTION

This invention pertains to a conveyor type oven having an insulated shell and a fan for moving a flow of cooling air between the insulation and the exterior shell; the invention also pertains to an inlet door, outlet door and single drive motor for both the fan and a conveyor within the oven.

2. PRIOR ART

The prior art ovens are typically operable in a temperature range of 225° to 500° F. When and if these ovens are operated at higher temperatures, critical external areas of the oven become too hot to touch. Examples of these critical areas are the access doors. A human can touch 140° F. without being burned or scalded, but anything over that temperature will at least be objectionably uncomfortable and probably of a temperature which can cause injury.

Another disadvantage of the prior oven is that it typically has an insulated access door. This access door usually has an inner shell, an outer shell and a layer of insulation between the shells. The periphery of the outer shell gets objectionably hot and when the access door is open, the very hot inner door is presented to the oven operator who will be burned if he or she touches the door inner shell.

The prior conveyor oven uses one motor to power the conveyor and if cooling is required by the oven, a complete additional cooling device must be installed. All conveyor mechanisms are believed to be subject to jamming, even if they are of a perfectly 100% reliable design, because an operator using the conveyor may place something upon the conveyor that will not work and if the conveyor jams, provision must be made to prevent structural damage to the conveyor.

OBJECTS OF THE INVENTION

It is an object of the present invention to provide an oven which can be heated to a high temperature while having an exterior shell which is cool to the human touch.

It is an object of the present invention to provide an oven which does not present a hot surface to a user.

It is a further object of the present invention to provide an oven which has minimal heat loss.

It is yet a further object of the present invention to provide an economical high temperature commercial food oven usable in a restaurant.

Another object of the present invention is to provide an oven having a loader for a conveyor.

Yet another object of the present invention is to provide a conveyor type oven having a single electric motor driving both a conveyor and a cooling device.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

SUMMARY OF THE INVENTION

In accordance with this invention, an oven is provided having an insulated oven chamber, an exterior cabinet, a conveyor within the oven chamber, and a fan for moving a flow of cooling air between the oven chamber and the exterior cabinet; the oven also has an inlet with interconnected inner and outer doors, an insulated outlet, and a single electric motor connected to both the conveyor and the fan, as distinct aspects of the invention.

ON THE DRAWINGS

AS SHOWN ON THE DRAWINGS

Figure 1:
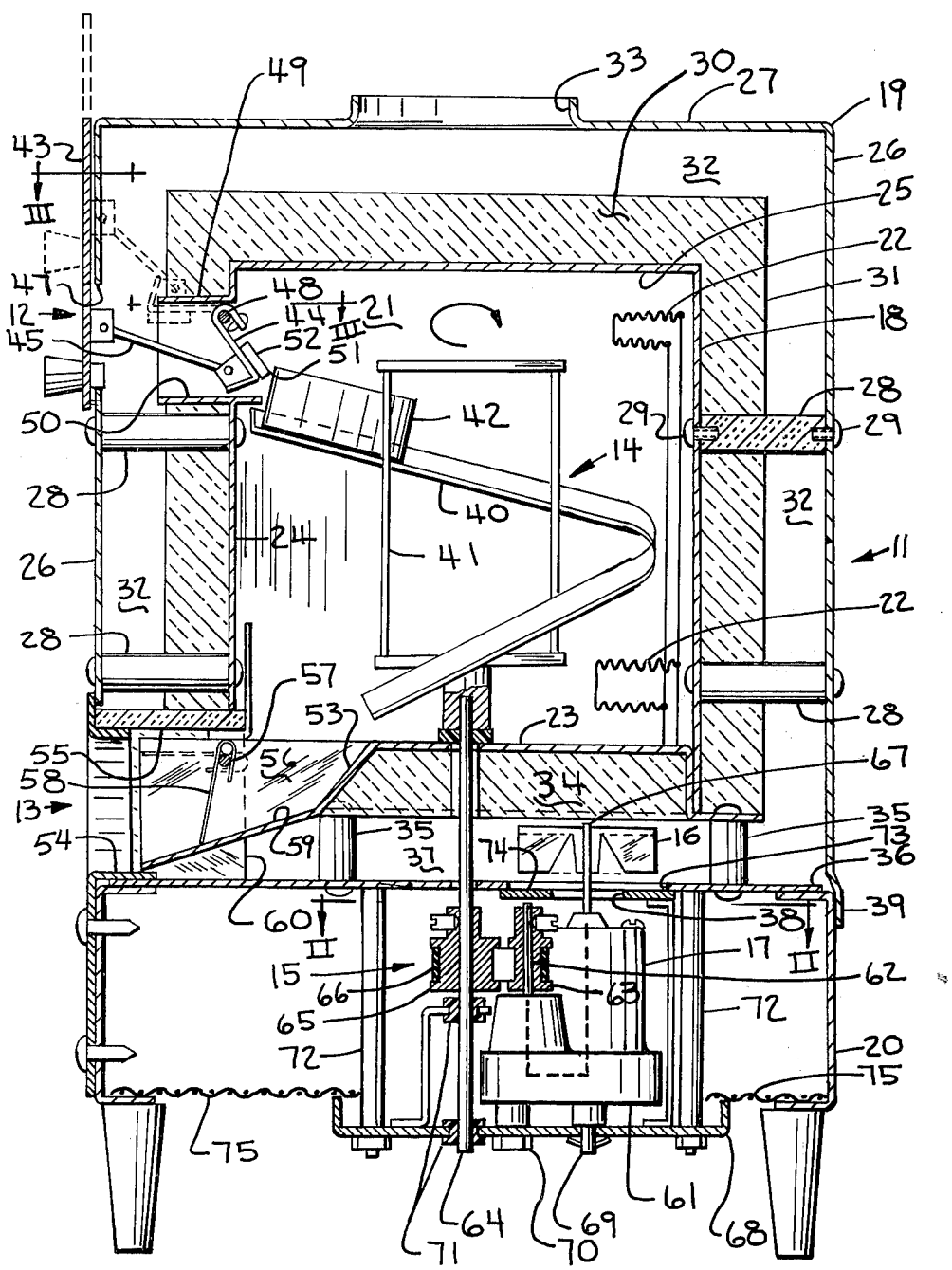
FIG. 1 is a sectional elevational view of the preferred embodiment of an oven provided in accordance with the principles of the present invention.

The principles of the present invention are particularly useful when embodied in an oven of the type illustrated in FIG. 1 and generally indicated by the numeral 10. The oven 10 includes a cabinet 11 having an inlet 12 and an outlet 13, a conveyor 14, a friction drive 15 connected to the conveyor 14, a fan 16 and an electric motor 17 connected to both the fan 16 and the conveyor drive 15.

The cabinet 11 includes an inner shell 18 formed of sheet metal, an exterior shell 19 formed of sheet metal and a base 20 also formed of sheet metal. The inner shell 18 forms a heatable oven chamber 21 which has therein electric heater elements 22. The inner shell 18 has a bottom 23, sides 24 and a top 25. The exterior shell 19 has sides 26 and a top 27. The inner shell sides 24 and 25 and exterior shell 19 are spaced from each other and held together by rigid insulators 28, which may be ceramic, and by screws 29 fastened through the sides 24, 26 into the insulators 28. There is a layer of thermal insulation 30 wrapped around the inner shell sides 24 and top 25. This insulation 30 is covered by a thin layer of an airtight foil 31, the preferred foil being aluminum. The exterior shell sides 26 and top 27 are spaced outwardly from the insulation 30 and there is a passageway 32 between the insulation 30 and exterior sides 26 and top 27 through which cool air can be moved. The exterior top 27 has an air outlet 33 for exhaust of a flow of cooling air. The inner shell bottom 23 also has a layer of foil covered insulation 34. The bottom 23 is spaced upward from and fastened to the base 20 by insulators 35, which may also be ceramic. The base 20 has a top panel 36 which is underneath the bottom 23. Between the top panel 36 and the bottom 23, there is a plenum chamber 37 for flow of cooling air. The plenum chamber 37 is actually part of the air passageway 32 and the path for cooling air flow extends around the bottom 23 and then upward between the inner and outer sides 24, 26. The fan 16 is continually operated and moves a flow of ambient air through an inlet 38, into and through the plenum 37 and through the passageway 32 and out of the outlet 33. The bottom edge of the exterior side 26 has a flange 39 which slips over and forms an airtight seal against the base 20. The cover assembly having sides 24, 26 and tops 25, 27, which are connected together and nest upon and are supported by the base 20 and bottom 23, is removable from the base 20 by grasping the exterior sides 26 and lifting the entire cover assembly upward and off of the base 20 for service access to the conveyor 14.

The conveyor 14 can be one of any well known types which can move an item through an oven. The conveyor 14 shown is of the rotary helical track type and as a trackway 40 extending from the inlet 12 to the outlet 13 and there is a rotatable reel 41 for engaging and advancing an item 42 around the trackway 40 from inlet 12 to outlet 13. When the item 42 is on the trackway 40, it is exposed to heat from the heater elements 22.

An important and distinct feature of the present invention is the structure of the inlet 12 in the oven 10. The inlet 12 has an outer door 43 movably mounted on the exerior shell 19, an inner door 44 movably mounted on the inner shell 18 and a connecting rod 45 which opens the inner door 44 where outer door 43 is opened.

Figure 3:
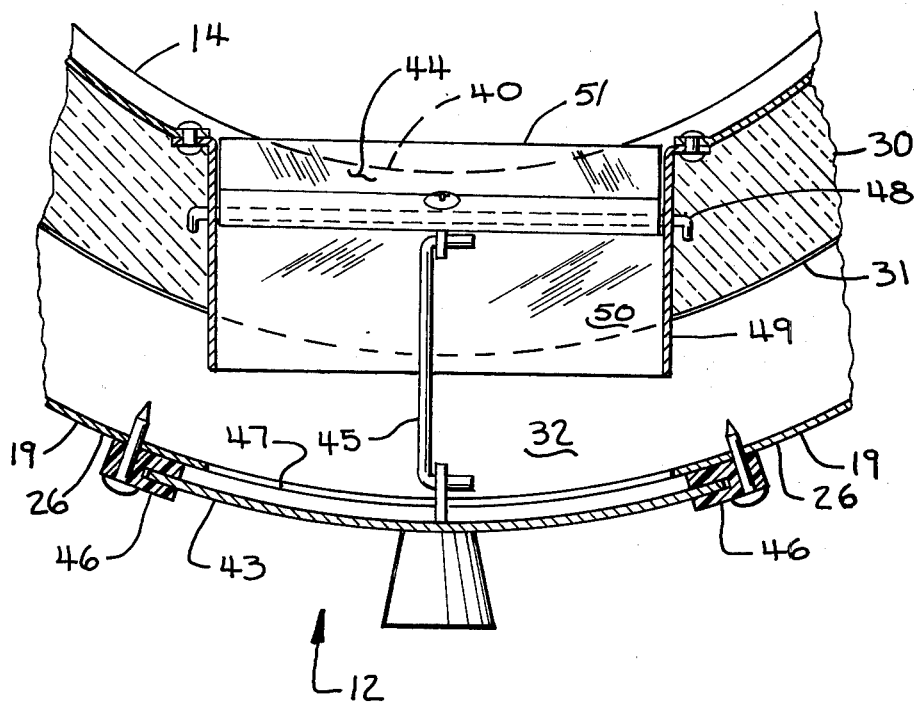
FIG. 3 is a sectional top view of the inlet along lines III—III of FIG. 1.

The outer door 43 is mounted in a pair of upright slides 46, as shown in FIG. 3 and slides upwardly to expose an opening 47 in the exterior side 26. The inner door 44 is rotatably mounted on a hinge shaft 48 which is journalled in a door frame 49 mounted to the inner shell 18. The inner door 44 is closely fitted to the door frame 49 to prevent air flow past the inner door 44. The frame 49 is surrounded by the insulation 30 and does not extend entirely between the inner and outer exterior shells 18, 19. The passageway 32 extends between the inner and outer doors 43, 44 and a flow of cooling air can pass between the inner and outer doors 43, 44 and a flow of cooling air can pass between the doors 43, 44 and maintain the outer door 43 cool. The inner door 44 rotates within the frame 49 and although it may extend into the passageway 32 when opened, the inner door 44 will never protrude out of the outer door opening 47 and in use, or when opened, the inner door 44 is out of reach or touch. The frame 49 has a lower shelf 50 which extends into the oven chamber 21, over the top of the conveyor track 40. The inner door 44 also protrudes into the oven chamber 21 and over the top of the conveyor track 40. The inner door 44 has a pusher surface 51, which projects over the top of the conveyor track 40. As previously mentioned, the oven 10 includes a fan for moving air through the passageway 32 and between the inner and outer doors 43, 44. The flow of cooling air tends to blow the inner door 44 into the oven chamber 21 and there is a counterweight 52 mounted on the inner door 44. The counterweight 52 biases the inner door 44 outward toward the outer door 43 as well as against the air flow. The counterweight 52 also assists in closing the inner door 44 under force of gravity. The outer door 43 is a relatively heavy door and closes under the force of gravity and while closing, also closes the inner door 44 through the action of the connecting rod 45. The entire inlet 12 is removable from the oven with the top cover assembly, which is removable as previously explained.

In use and operation of the oven inlet 12, the outer door 43 is lifted and opened and when the outer door 43 goes up, the connecting rod 45 is pulled up and the inner door 44 is pulled open. An item, such as 42, is inserted through the exterior cabinet opening 47 and placed on the frame shelf 50. The outer door 43 is then lowered and the weight and force of the closing outer door 43 is applied to the inner door 44 through the connecting rod 45. The pusher surface 51 of the inner door makes contact against the item 42 and as the inner door 44 is closed, the pusher surface 51 pushes the item off the frame shelf 50 and into the trackway 40 of conveyor 14. One of the important features of this inlet 12 is that if the outer door 43 is not completely closed, the inner door 44 can push the connecting rod 45 out and open the outer door 43. This is of great advantage if the reel 41 is not in the correct position to accept the item 42. Were item 42 placed in the inlet 12 and the outer door 43 released to close when the reel 41 will not accept the item 42, the item 42 will be pushed back into the inlet 12, the inner door 44 will be re-opened by the item 42 and the connecting rod 45 will force the outer door open. When the reel 41 then moves to a position where it will accept the item 42, the outer door will automatically, and without assistance, close and force the inner door 44 closed and the pusher 51 will place the item 42 upon the trackway 40.

When the doors 43 and 44 are closed, the fan 16 will move a flow of cooling air through passageway 32 between the doors 43 and 44 and the counterweight 52 will help keep the inner door 44 closed against any pressure of the flowing air.

With this construction of inlet 12, the outer door 43 is always cool and the hot inner door 44 is never directly exposed to where it can be easily or accidentally touched. This inlet 12 is especially well suited to a high temperature oven in which the oven chamber 21 is maintained near 600° F. for use with frozen foods.

Another important and distinct feature of the oven 10 of this invention is the outlet 13 which has a discharge chute 53 directed out towards a separate outlet frame 54, and a wrap 55 of insulation connecting and adjoining the chute 53 and frame 54.

The discharge chute 53 is connected to and extends downward from the bottom 23 of the oven inner shell 18. The chute 53 has a pair of sides 56, one of which is shown and there is a horizontal shaft 57 mounted in the sides 56 and extending across the chute 53. There is an outlet door 58 mounted on the shaft 57. The outlet door 58 spans the width of the chute 53 between the sides 56. The outlet door 58 is a thin piece of sheet metal formed into an inverted "J" shape. The closed end of the inverted "J" shaped outlet door 58 has a spacer welded in for supporting the top of the outlet door 58 above the shaft 52 a distance which exceeds the thickness of the sheet metal forming the outlet door. The discharge chute has a bottom 59 which is not insulated and extends downward past the outlet door 58. The chute bottom 59 extends through the passageway 32 and is exposed to the flow of cooling air through the passageway 32. The outlet frame 54 is mounted to the base 20 and is separate from and spaced from the discharge chute 53. The insulation wrap 55 is a "C" shaped piece of rigid insulation, such as rigid asbestos, and the insulation wrap includes a flange 60 extending downward along and to the outside of each chute side 56 and the outlet frame 54. The outlet door shaft 57 extends through the insulation wrap flanges 60 and retains the wrap 55 to the outlet 13. The oven chamber inner shell 18 and the insulation 30 have a notch to fit around and against the outlet 13, as does the exterior shell 19.

In operation of the oven outlet 13, the outlet door 58 is normally closed and there is a flow of air against the chute bottom 59 which helps keep the outlet cool. The outlet frame 54 is not in direct thermal contact with the oven chamber 21, but is adjoined to the discharge chute by the insulation wrap 55. When the conveyor 14 discharges an item 42, the item 42 falls into the chute 53 and goes downward on the bottom 59. The item 42 makes contact with and opens the outlet door 58 and after the item 42 passes under the outlet door 58 the force of gravity automatically closes the outlet door 58. The outlet door 58 operates only as required, is completely independent of the inlet 12, and has a very fast closing action. The outlet door 58 is very easily removed for cleaning by opening the door 58 to the open position shown in dotted line and pushing the door 58 inward towards the oven chamber 21 until the door 58 falls off of the shaft 57. The door 58 will then slide down and out between the sides 56 of the chute 53. The door 58 is easily reinstalled by inserting it into the outlet 13, and sliding it outward over the top of the shaft 57 until it swings downward into the normal closed position. This construction of outlet 13 is very economical, meets sanitation codes and presents no hot surfaces for touch nor does it require any labor for operation.

A further distinct and most important feature of the oven 10 of this invention is the single electric motor 17 connected to drive both the fan 16 and the friction drive 15 to the conveyor 14. It will be appreciated that in a commercial food oven that the oven is pre-heated and maintained in a heated state over the operating hours of the business in which the oven 10 is used. As the oven 10 is heated constantly, the fan 16 will be continually operated. For quickness of service, which is important in the food business, the conveyor 14 will also continually be operated. The conveyor 14 in the present oven 10 is a very slow speed device, and surprising as it may seem, when a single electric motor 17 drives both the fan 16 and the conveyor 14, ninety percent (90%) of the motor 17 output power is consumed by the fan 16 and only ten percent (10%) of the power is required by the conveyor 14.

It is an accepted expectation that any conveyor 14 can be jammed, even if only once every few years. With the single motor drive of the present invention, if and when, and hopefully it is a seldom if ever occurrence, that the conveyor 14 jams, it will follow that the electric motor 17 will slow down and stall out and the fan 16 will almost or completely cease to operate. When this happens, the entirety of the motor 17 output will be directed into the driving of the conveyor 14. A typical electric motor has a stall torque of about twice its running torque and as a result, the motor 17 will direct into the conveyor 14 upwards of 20 times the normal operating torque required or used by the conveyor 14. With an economical and lightweight design of conveyor 14, such a torque is sufficient to destroy the entire conveyor 14 and turn it right off of the oven base 20 and completely destroy the oven 10. However, the economy of the single motor makes its use enticing and to make it useful, a friction drive 15 is provided between the electric motor 17 and the conveyor 14. The friction drive 15 will handle a torque of a reasonable multiple of the torque required to operate the conveyor 14 but will slip at a torque below that which would structurally damage a jammed conveyor 14.

The electric motor 17 includes a reduction gearbox 61 having an output shaft 62. There is a pulley 63 removably mounted on the output shaft 62 and retaind by a set screw as shown. There is a rotatable input shaft 64 connected to the conveyor 14 and having a pulley 65 removably secured by a set screw as shown. There is a friction drive belt 66 connecting the pulleys 63, 65 and providing the friction drive and friction release in the event of jamming of conveyor 14.

The motor 17 has a second and full speed output shaft 67 upon which the fan 16 is directly mounted. The fan 16 is a centrifugal blower which rotates co-axially with the armature of motor 20 at about 3200 r.p.m. whereas the first output shaft rotates only at about 1 r.p.m. The motor 17 together with its gearbox 61 is mounted to a motor chassis 68 by a fastener 69 which is positioned co-axially with the fan output shaft 67 and the fan 16.

The motor 17 and gearbox 61, and radially spaced first output shaft 62 are rotatable about the fastener 69 and the axis of the fan 16 for tensioning the drive belt 66. In order to maintain tension on the drive belt 66, there is a tightener 70 for securing and maintaining the motor 17 in a position which keeps the drive belt 66 tensioned as desired. The axis of both the conveyor input shaft 64 and the fan 16 are fixed with respect to each other and with respect to the motor chassis 68.

Figure 2:
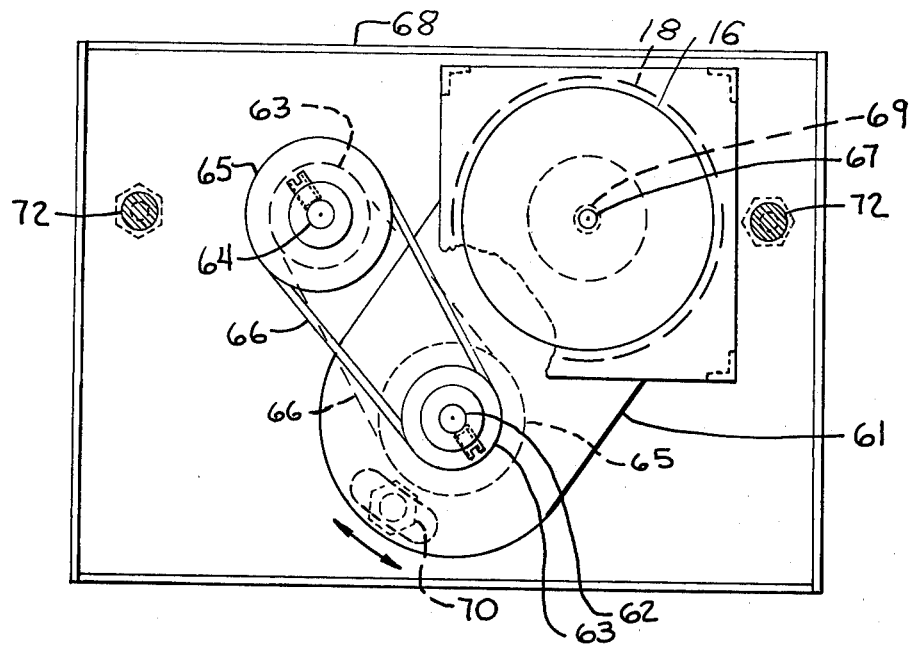
FIG. 2 is a top view of the fan and conveyor drive taken aong lines II—II of FIG. 1.

The conveyor input shaft 64 is mounted in the motor chassis 68 by a pair of bearings 71. The input shaft 64 freely floats up and down in the bearings 71 and is axially positioned by the tensioned drive belt 66 which lines up the pulleys 63 and 65 with each other. The pulleys 63 and 65 are of different diameters, the large pulley is shown on the conveyor input shaft 64 and the small pulley is shown on the motor output shaft 62. The pulleys 63, 65 are interchangeably mountable on either of the shafts 62 or 64 and are reversible where the large pulley may be mounted on the output shaft 62 and the small pulley may be mounted on the conveyor inut shaft 64 for changing the speed of the conveyor 14, as is shown in dotted line in FIG. 2.

The motor chassis 68 and the components mounted thereon, namely the motor 17, fan 16 and friction drive 15, are removable as a unit from the oven 10. The base 20 has a pair of mounts 72 removably fastening the motor chassis 68 to the oven 10. The conveyor input shaft 64 extends upward from the motor chassis 68 and projects through the cabinet 11 and into the oven chamber 21 and the conveyor input shaft 64 can be withdrawn vertically downward and out of the oven 10 together with the motor chassis 68. The base top panel 36 has a fan access 73 through which the fan 16 may be either installed in or removed from the air plenum 37. The air inlet 38 is in an aperture plate 74 which is mounted to the motor chassis 68 and positioned between the fan 16 and motor 17. The aperture plate 74 seals against the base top panel 36, and the air inlet 38 in the aperture plate 74 provides the source of air for the centrifugal fan 16. The bottom of the base 20 has a screen 75 forming and covering an inlet to the fan air inlet 38. The screen 75 has an opening in through which the motor 17, fan 16 and friction drive 15 are installable or removable and the motor chassis 68 fits against the screen 75. In operation the use of the oven 10, the fan 16 and conveyor 14 are continually operating. Ninety percent (90%) of the power from the motor 17 goes to drive the fan 16 and ten percent (10%) goes to drive the conveyor 14. The fan 16 draws in air through the screen 75 and the inlet 38 and moves the air through the passageway 32 and then out of the outlet 33 keeping the exterior shell 19, the outlet 13, and the inlet outer door 43 cool. If and when the conveyor 14 begins to jam, the motor 17 will slow down under the load and the torque to the conveyor input shaft 64 will be increased. The friction drive 15 will drive at and up to about twice the normal maximum required torque but beyond that begins to slip and disconnect the motor 17 from the conveyor 14. With this structure, extra power is available to try and overcome a jam but yet a clutch is provided to release the conveyor 14 if it is badly jammed and therefor structural damage is prevented. When the motor chassis 68 is removed from the oven 10, the speed of the conveyor 14 can be easily changed. The temperature of the oven chamber 21 is constant at about 600° F. for pizza. Therefore the cooling load to keep the cabinet exterior shell 19 cool is constant and the fan 16 should turn at a constant speed. In a food operation using the present oven 10, frozen pizzas take about three and one-half minutes to cook and refrigerated thawed pizzas take about two and one-half minutes to cook. It is at the discretion of the retailer to select his preferred mode of operation. By providing one of the pulleys 63 or 65 about 40% larger than the other pulley, the conveyor cycles of either 2½ or 3½ minutes can be obtained by the user of oven 10 by merely removing the motor chassis 68 and reversing the pulleys 63 and 65. With either ratio, the fan 16 speed remains constant and the oven exterior shell 19 remains at the same temperature. This oven 10 may operate at between 500° and 900° F. and even at these temperatures it does not present a single hot edge or surface that will burn a user. When the oven 10 is being used, none of the access doors open up past the exterior shell 19 and no additional counter space need be provided.

Although various minor modifications may be suggested by those versed in the art, it should be understood that we wish to embody within the scope of the patent warranteed hereon, all such embodiments as reasonably and properly come within the scope of our contribution to the art.

We claim as our invention:

1. An oven of the conveyor type having a heatable inner oven chamber and an outer shell coolable by a forced flow of ambient air between the oven chamber and the outershell, comprising:
   a. a base;
   b. a metal shell mounted atop of and on the base and forming together with the base a heatable oven chamber having an electric heater therein for heating of the chamber;
   c. a conveyor mounted within the oven chamber for moving an item to be heated through the oven chamber during heating of such item;
   d. means for driving the conveyor;
   e. means for providing access to the oven chamber, for loading and unloading items upon the conveyor;
   f. a layer of thermal insulation mounted around and enclosing the oven chamber metal shell;
   g. an exterior cabinet shell mounted outside of the insulation, the cabinet shell being spaced outwardly from the insulation, with there being an air passageway between the oven chamber insulation and the cabinet shell, the passageway having an air inlet and an air outlet in fluid communication with ambient; and
   h. a fan mounted in the oven and in fluid communication with the passageway for moving a flow of ambient air through the inlet and thence into and through the passageway and thence out of the outlet, for cooling the exterior cabinet during heating of the oven chamber to a temperature above the temperature of ambient.

2. An oven according to claim 1, in which the access means includes an inlet to the conveyor for loading of items upon the conveyor, said inlet having an outer door movably attached to and mounted on the cabinet shell, an inner door movably attached to and mounted on the oven chamber shell, means operatively connecting the inner and outer doors for simultaneous opening thereof, and a door cooling air passageway extending between the doors and in fluid communication with the passageway inlet and outlet for movement of air between the doors by the fan for cooling of the outer door when the oven chamber and the inner door are heated.

3. An oven according to claim 2, in which the oven chamber metal shell includes an inlet frame around the inner door, the frame being closely fitted to the door and extending through the layer of insulation, the door cooling air passageway being in between the inlet outer door and the oven chamber inlet door frame.

4. An oven according to claim 2, in which the access means includes an outlet for discharge of an item from the conveyor, the outlet being separate from the inlet and extending through the air passageway and having a normally closed door which is openable by an item being discharged off the conveyor and into the outlet, the door being self closing afte discharge of such an item through the outlet.

5. An oven according to claim 1, in which the oven chamber shell includes an insulated bottom panel, the bottom and insulation being attached to and spaced upwardly from the base, there being an air plenum chamber between the bottom insulation and the base, the air plenum being in fluid communication with the air passageway, said fan being in said plenum chamber with there being an ambient air inlet to the fan in and through the bottom of the base, said base having means for supporting the ambient air inlet above a surface upon which the oven is placable.

6. An oven according to claim 1, in which the oven chamber shell includes
   1. a thermally insulated bottom panel, the bottom and insulation being attached to and spaced upwardly from the base, there being an air plenum chamber between the bottom insulation and the base, the air plenum being in fluid communication with the air passageway; and
   2. insulated side and top oven chamber panels sitting detachably upon the bottom panel, the cabinet exterior shell being fixedly fastened to the oven chamber top and side panels and having sides extending down and forming a detachable air tight seal against the base, the air passageway extending from the air plenum around the bottom corners of the oven chamber and upward between the side insulation and cabinet exeterior shell sides.

7. An oven according to claim 1, in which the access means includes an item outlet through the oven chamber shell and the exterior cabinet shell, said outlet having a discharge chute from an end of the conveyor, with the discharge chute extending between the oven chamber shell and the cabinet shell and through the air passageway, for direct exposure of the discharge chute to a flow of air in the passageway for cooling of the oven outlet when the oven chamber is heated.

8. An oven according to claim 1, including an electric fan motor having an output shaft upon which the fan is directly mounted and a friction drive operatively connecting the fan motor and the conveyor for simultaneously driving of both the fan and the conveyor by the fan motor.

9. A manually loadable oven of the conveyor type, having a manually openable exterior loading door which is thermally separated from a heatable oven chamber for maintaining the manually openable door at a temperature suitable for noninjurious human contact during heating of the oven chamber, comprising:
   a. a cabinet having therein an inner shell defining a heatable oven chamber;

b. a conveyor within the oven chamber for moving an item to be heated through the chamber and from a chamber inlet to a chamber outlet;

c. an inlet extending through the cabinet and the inner shell and into the oven chamber, the inlet having
  1. a normally closed outer door movably mounted on and fastened to the cabinet; said outer door being manually openable for acccess to an inner door;
  2. a normally closed inner door movably mounted on and fastened to the inner shell. said inner door being physically spaced from said outer door,
  3. means operatively connecting the outer door to the inner door for opening the inner door as the outer door is opened, and
  4. a pusher surface on the oven chamber side of the inner door for boosting an item to be heated from the inlet and onto the conveyor; and d. an outlet in the cabinet for discharging heated items from the oven chamber as such heated items come off the conveyor.

10. An oven according to claim 9, including a frame for the inner door, said frame being mounted to the inner shell and being spaced inwardly from the cabinet, the inner door being mounted in the frame and having a peripheral edge closely fitted to the frame.

11. An oven according to claim 10, in which the inner door frame has a lower shelf extending over the conveyor, said pusher surface being operable for boosting an item to be heated off of the shelf and onto the conveyor.

12. An oven according to claim 9, in which the pusher surface of the inner door extends into the oven chamber and over the conveyor.

13. An oven according to claim 9 including:
  a. mounting means for providing an upwardly openable outer door and for providing closing of the outer door under the force of gravity, said mounting means fastening the outer door to the cabinet; and
  b. said door connecting means being operable for closing the inner door upon downward closing of the outer door under the force of gravity.

14. An oven according to claim 9, in which the outer door is mounted to the cabinet by a vertical slide, the inner door is mounted to the inner shell by a hinge, the outer door being upwardly slidable for opening and the inner door being outwardly pivotable for opening, said door connecting means being operable for pulling the inner door open as the outer door is slid upwardly in the vertical slide.

15. An oven according to claim 9, in which the door connecting means is operable for completely opening the outer door from a partially open position, upon opening of the inner door by an item to be heated which is pushed back into the inlet by the conveyor.

16. An oven according to claim 9, in which the cabinet includes means for moving a flow of ambient air between the inner and outer doors, for cooling the outer door.

17. An oven according to claim 16, in which the air moving means comprises a fan for blowing air between the doors, and the inner door has a counterweight thereon for biasing the inner door toward the outer door.

18. An oven of the conveyor type having automatic discharge of heated items off of the conveyor and out of the oven comprising:

a. a cabinet having therein an inner shell defining a heatable oven chamber;

b. a conveyor within the oven chamber for moving an item to be heated through the chamber and from a chamber inlet to a chamber outlet;

c. an inlet in and through the cabinet and the inner shell for placing an item to be heated upon the conveyor; and d. an outlet through the cabinet and the inner shell for discharging heated items out of the oven as they come off the conveyor, the outlet having
  1. a discharge chute extending downward from a bottom of the oven chamber shell,
  2. an outlet frame mounted to a base of the cabinet, the outlet frame being separate from and at a lower end of the discharge chute,
  3. an insulation wrap of a rigid insulating material mounted around and adjoining the discharge chute and the outlet frame; and
  4. a normally closed outlet door mounted in and to the discharge chute, the outlet door normally closing the outlet.

19. An oven according to claim 18, in which the discharge chute includes a pair of sides and a horizontal shaft extending through the insulation wrap through the chute sides and across the chute, the outlet door being mounted on the shaft between the chute sides and the insulation wrap being retained to the outlet by the shaft.

20. An oven according to claim 18, including a horizontal shaft extending across the discharge chute, the outlet door having the shape of an inverted "J" hanging on the shaft, the outlet door being removable from the oven by pushing the door, when in an open position, towards the oven chamber until the door falls off of the shaft and down upon a bottom of the discharge chute on which the door is slideable out of the outlet.

21. An oven according to claim 26, in which the closed end of the inverted "J" shaped outlet door extends above the shaft more than the thickness of the door.

22. An oven according to claim 18, in which the bottom of the oven inner shell is insulated and the discharge chute includes a bottom which is not insulated, the cabinet having means for moving a flow of ambient air past the chute bottom for cooling the chute.

23. An oven of the conveyor type having a common source of motor-power for both the conveyor and an oven cooling fan comprising:
  a. a cabinet having an exterior shell and an inner shell, the inner shell defining a heatable oven chamber;
  b. a conveyor inside of the inner shell for moving an item to be heated through the oven chamber;
  c. means providing access through the cabinet into the oven chamber for loading items to be heated upon the conveyor and for unloading heated items from the conveyor;
  d. a friction drive connected to the conveyor for driving the conveyor and moving items to be heated through the chamber;
  e. a fan mounted in the cabinet and fluidly connected to the cabinet for moving a flow of ambient air into the cabinet and between the inner and exterior shells and thence to ambient, for cooling the exterior shell while the oven chamber and the inner shell are heated; and
  f. a single electric fan motor connected to both the friction drive and the fan with the fan being directly mounted on an output shaft of the motor, for simultaneously driving of both the conveyor and the fan by the single fan motor.

24. An oven according to claim 23, in which
   a. the friction drive includes a rotatable shaft connected to positively drive the conveyor, a pulley on the rotatable conveyor shaft, a pulley on a first output shaft from the electric motor and a friction drive belt connecting the pulleys one to the other; and in which
   b. the electric motor has a second output shaft having the fan mounted directly thereon, the motor being rotatably mounted to the oven cabinet by a fastener positioned co-axially with the second output shaft and the fan, and being rotatable in the cabinet and about the axis of the fan for tensioning the drive belt between the two pulleys; and
   c. means for mantaining the motor in position in which the friction drive belt is tight on both pulleys for maintaining tension on the drive belt.

25. An oven according to claim 23, including
   a. a rotatable input shaft positively connected to drive the conveyor;
   b. a pulley of a first diameter on the conveyor input shaft;
   c. a pulley of a second diameter on an output shaft from the electric motor;
   d. a friction drive belt operatively connecting the pulleys; and
   e. the pulleys of first and second diameter being of different diameters and being interchangeably mountable on either of the conveyor input or electric motor shaft, for changing the speed of the conveyor by changing the pulleys on the shafts.

26. An oven according to claim 25, including a motor chassis having all of the electric motor, fan and conveyor input shaft mounted thereon, said motor chassis being removable with said motor, fan and input shaft as a unit from the oven cabinet, the conveyor input shaft being positioned and held in the chassis by the pulleys and the drive belt.

27. An oven according to claim 23, including a motor chassis having the electric motor, fan and friction drive mounted thereon, said chassis being removable with said motor, fan, and friction drive as a unit from the oven cabinet, the fan being a centrifugal blower wheel mounted on a shaft of the motor with there being an inlet aperture plate mounted on the chassis and positioned between the fan and the motor, with the cabinet having a fan access through which the fan may be installed and removed and against which the fan inlet plate is airtightly positioned.

28. An oven according to claim 27, in which the motor chassis includes a conveyor input drive shaft extending from the friction drive through the cabinet and into the oven chamber, the conveyor shaft being withdrawable from the oven chamber and being removable with the motor chassis unit from the cabinet.

29. An oven according to claim 28, in which the axis of the conveyor input drive shaft and axis of the fan are fixed with respct to each other in the oven and on the motor chassis, the motor being rotatably mounted to the chassis by a fastener positioned co-axially with the fan, the friction drive including a pulley mounted on the conveyor input shaft, a pulley mounted on a second and separate output shaft from the motor, the second shaft being radially spaced from the axis of the fan, and a friction drive belt between and connecting the pulleys, said motor and said second shaft being rotatable about the axis of the fan for tensioning the drive belt between the pulleys.

30. An oven according to claim 27, in which the cabinet includes a screen positioned against and around the motor chassis, the screen forming an air inlet through the cabinet and to the fan inlet plate.

31. A manually loadable oven of the conveyor type having a manually openable loading door which is thermally separated from a heatable oven chamber for maintaining the manually openable door at a temperature suitable for noninjurious human contact thereagianst while the oven chamber is heated, comprising:
   a. a cabinet having therein an inner shell defining a heatable oven chamber;
   b. a conveyor within the oven chamber for moving an item to be heated through the chamber and from a chamber inlet to a chamber outlet;
   c. an outlet in the cabinet for discharging heated items from the oven chamber as such heated items come off the conveyor;
   d. an inlet extending through the cabinet and the inner shell for loading items to be heated upon the conveyor, said inlet having
      1. a normally closed outer door movably mounted upon and fastened to the cabinet, said outer door being openable for access to an inner door,
      2. an inlet aperture in and through the oven inner shell for providing access from the outer door to the conveyor within the oven chamber,
      3. a normally closed inner door fitted in and normally closing the inlet aperture,
      4. means operatively connecting the outer door to the inner door for opening the inner door as the outer door is opened; and
   e. means for moving a flow of ambient air between the inner and outer door while the oven chamber is heated, for cooling the outer door and maintaining the temperature of the outer door at a temperature which is safe for human contact thereagainst.

* * * * *